(12) United States Patent
Hardjono

(10) Patent No.: US 6,363,481 B1
(45) Date of Patent: Mar. 26, 2002

(54) METHOD AND APPARATUS FOR SECURE DATA STORAGE USING DISTRIBUTED DATABASES

(75) Inventor: Thomas P. Hardjono, Arlington, MA (US)

(73) Assignee: Nortel Networks Limited, St. Laurent (CA)

(*) Notice: Subject to any disclaimer, the term of this patent is extended or adjusted under 35 U.S.C. 154(b) by 0 days.

(21) Appl. No.: 09/128,350

(22) Filed: Aug. 3, 1998

(51) Int. Cl.[7] .................................................. H04L 9/00
(52) U.S. Cl. ........................................................ 713/165
(58) Field of Search .................................. 713/193, 165; 380/277, 278, 286

(56) References Cited

U.S. PATENT DOCUMENTS

| | | | | |
|---|---|---|---|---|
| 4,417,338 A | * | 11/1983 | Davida | 380/286 |
| 5,625,692 A | * | 4/1997 | Herzberg et al. | 380/286 |
| 5,675,649 A | * | 10/1997 | Brennan et al. | 380/286 |
| 5,764,767 A | * | 6/1998 | Beimel et al. | 713/180 |
| 6,035,041 A | * | 3/2000 | Frankel et al. | 380/30 |
| 6,052,468 A | * | 4/2000 | Hillhouse | 380/281 |

OTHER PUBLICATIONS

Zheng et al. Reusing shares in secret sharing schemes. The Computer Journal. vol. 37, issue 3. 1994. pp. 199–205.*
Schneier, Bruce. Applied Cryptography: Protocols, Algorithms, and Source Code in C, 2nd ed. Oct. 1995. sections 3.6–3.8 and 23.2.*
Shamir, Adi, "How to Share a Secret," Communications of the ACM, Nov. 1979, vol. 22, No. 11, pp. 612–613.

* cited by examiner

*Primary Examiner*—Gail Hayes
*Assistant Examiner*—Chris Tucker
(74) *Attorney, Agent, or Firm*—Blakely Sokoloff Taylor & Zafman LLP

(57) ABSTRACT

A method and apparatus for secure data storage using distributed databases generates a first plurality of shares, using a first threshold scheme, based on a block of data, with at least a subset of the first plurality of shares being needed to re-create the block of data. The first plurality of shares are then distributed to a plurality of distributed databases.

21 Claims, 5 Drawing Sheets

METHOD AND APPARATUS FOR SECURE DATA STORAGE USING DISTRIBUTED DATABASES

BACKGROUND OF THE INVENTION

1. Field of the Invention

The present invention pertains to data storage mechanisms. More particularly, this invention relates to secure data storage using distributed databases.

2. Background

As technology has advanced and the "information age" has grown, the need for data storage has become increasingly important. It is also increasingly becoming a requirement that such data storage be secure so that data confidentiality is maintained. Additionally, it is also becoming a requirement that storage of such data be fault-tolerant in order to insure against accidental loss of the data due to, for example, equipment failures.

Current mechanisms for providing secure data storage typically encrypt the data using an encryption key. Encryption typically requires that a user trying to access the data have an encryption key in order to decrypt the data. Thus, if the encryption key is compromised (e.g., stolen or "broken"), an unauthorized individual can access the data. While such systems can provide a significant amount of security, they are still vulnerable because compromising a single key provides an unauthorized individual with the protected data.

One solution to this problem is to separate a document into multiple pieces and encrypt each piece separately using the same or different encryption keys. This solution provides an additional level of security because possibly multiple keys must be compromised in order to access the entire data. However, this solution can still be problematic because compromising of a single key allows an entire piece of data to be accessible to the unauthorized user. For example, one piece of a document may be the most important (e.g., the body of a letter), so that having that one piece compromised and accessible to an unauthorized individual circumvents this additional level of security.

Thus, a need exists for an improved way to securely store data.

SUMMARY OF THE INVENTION

A method and apparatus for secure data storage using distributed databases is described herein. According to a method of the present invention, a first plurality of shares are generated, using a first threshold scheme, based on a block of data, with at least a subset of the first plurality of shares being needed to re-create the block of data. The first plurality of shares are then distributed to a plurality of distributed databases.

According to one embodiment, the block of data and/or the generated shares are encrypted using an encryption key. A second plurality of shares is also generated, using the same or a different threshold scheme, based on the encryption key, with at least a subset of the second plurality of shares being needed to re-create the encryption key. The second plurality of shares is then also distributed to the plurality of distributed databases.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 1:
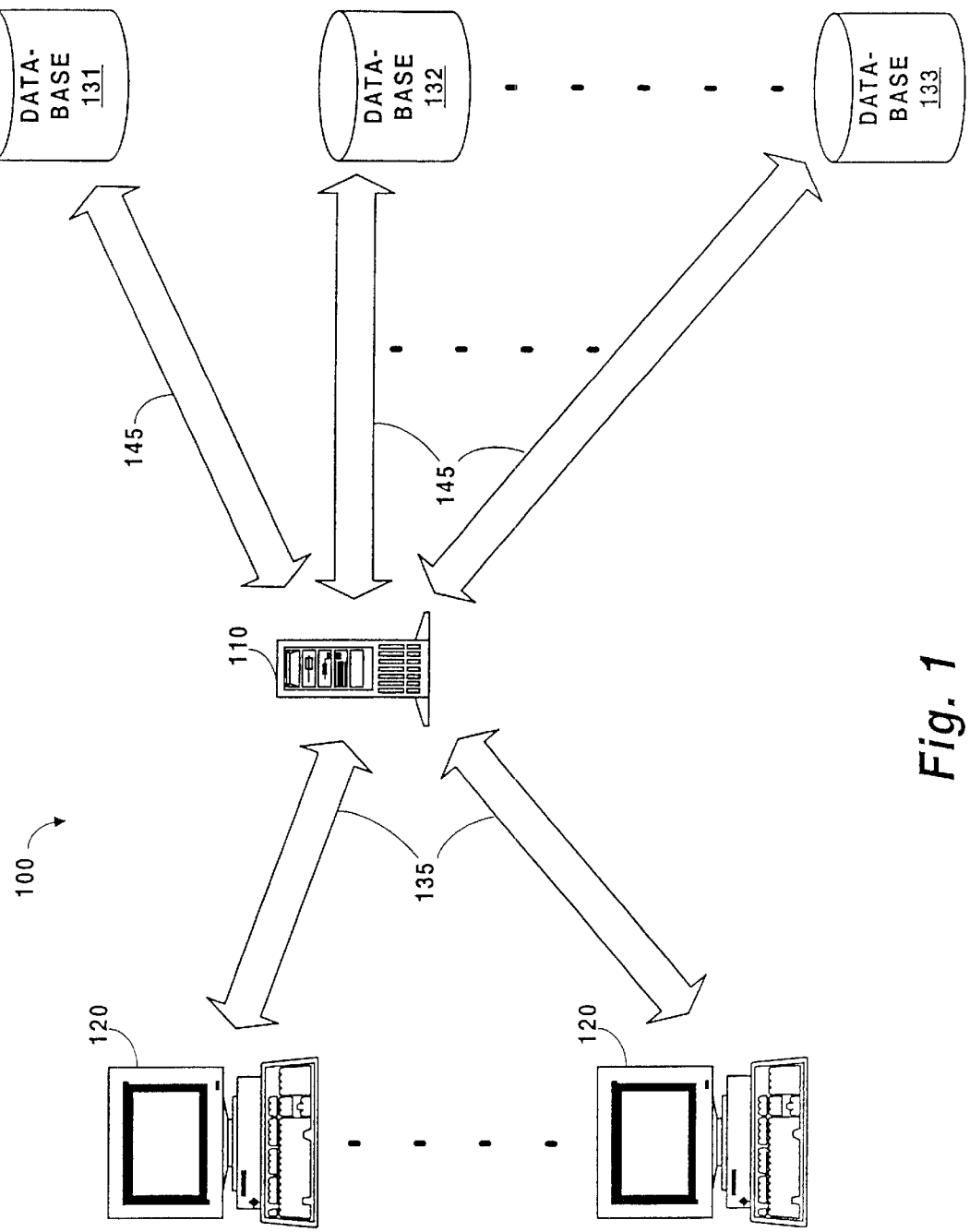
FIG. 1 is a block diagram illustrating a distributed database environment incorporating embodiment of the present invention.

In the following detailed description numerous specific details are set forth in order to provide a thorough understanding of the present invention. However, it will be understood by those skilled in the art that the present invention may be practiced without these specific details. In other instances well known methods, procedures, components, and circuits have not been described in detail so as not to obscure the present invention.

In alternative embodiments, the present invention may be applicable to implementations of the invention in integrated circuits or chip sets, wireless implementations, switching systems products and transmission systems products. For purposes of this application, the terms switching systems products shall be taken to mean private branch exchanges (PBXs), central office switching systems that interconnect subscribers, toll/tandem switching systems for interconnecting trunks between switching centers, and broadband core switches found at the center of a service provider's network that may be fed by broadband edge switches or access multiplexors, and associated signaling, and support systems and services. The term transmission systems products shall be taken to mean products used by service providers to provide interconnection between their subscribers and their networks such as loop systems, and which provide multiplexing, aggregation and transport between a service provider's switching systems across the wide area, and associated signaling and support systems and services.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

FIG. 1 is a block diagram illustrating a distributed database environment incorporating one embodiment of the present invention. As illustrated, distributed database environment 100 includes a server 110 (also referred to as a "secret-sharing" server) and multiple (x) distributed databases 131, 132, and 133 coupled to server 110. Additionally, multiple (y) client systems 120 are coupled to server 110 as illustrated.

Each client system 120 as illustrated can be any of a wide variety of conventional hardware systems including general purpose computers and Internet "appliance" devices, such as a WebTV™ Internet Terminal available from Sony Electronics Inc. of Park Ridge, N.J., or Philips Consumer Electronics Company of Knoxville, Tenn. Additionally, it is to be appreciated that each client system 120 can be a desktop or workstation system, a smaller portable system (e.g., a conventional "laptop" or "notebook" computer), a hand-held device (e.g., Personal Digital Assistants available from 3Com of Santa Clara, Calif., or Apple Computer, Inc. of Cupertino, Calif.), etc.

Server 110 implements the secure data storage according to one embodiment of the present invention. Server 110 securely stores data by creating a plurality of "shares" of the data. A share of the data is calculated in the illustrated embodiment by applying a "threshold scheme" to the data. A threshold scheme generates multiple (n) "shares" based on the document of which at least a subset (k) are required in order to re-construct the document. Each share of the data is based on the data, however, no portion of the document can be re-constructed based on the share alone (rather, k shares are required).

Once generated, the separate shares are distributed to multiple separate databases 131–133. In one embodiment, each of the n shares is sent to a different one of n or more databases. Upon subsequent receipt of a request for the data, server 110 verifies that the requester is entitled to access the data. Once the requestor's access is verified, server 110 obtains at least k shares from the databases and re-constructs the original data using these k shares. The re-constructed data is then returned to the requester. In the illustrated embodiment, each of the databases 131–133 is situated in a different physical location than the others.

Each of the databases 131–133 can be associated with a database server to control data transfers to and from the database. Alternatively, each of the databases 131–133 can be simply the storage medium containing the data (e.g., a removable magnetic or optical disk, a magnetic tape, etc.). Such storage media can then be located in different locations (e.g., different fire-proof safes, etc.).

The couplings 135 between client systems 120 and server 110 as well as the couplings 145 between server 110 and databases 131–133 can be any of a wide variety of conventional communication "channels" over which data transfer can occur. Examples of such couplings 135 and 145 include, but are not limited to, networks (such as the Internet or a local area network (LAN)), "direct" connections (such as a dial-in connection using a modem over a dedicated phone line), "manual" connections (such as transporting magnetic or optical disks), etc. Additionally, it is to be appreciated that couplings 135 and 145 may include multiple different such channels, and that different couplings can be different types of channels.

According to one embodiment of the present invention, couplings 135 and 145 are "secure" couplings. This security can be provided in any of a wide variety of manners, such as by encrypting all information transmitted over the couplings, and/or by requiring server 110 to provide an identifier and password in order to access databases 131–133. Alternatively, databases 131–133, server 110, and/or client systems 120 could operate in a "call-back" manner. For example, server 110 can indicate to one of databases 131–133 that it needs to retrieve information and that database responds by calling the server 110 at a predetermined (e.g., programmed) phone number. Alternatively, databases 131–133 may access server 110 via couplings 145 at regular or irregular intervals in order to retrieve any queued requests from server 110.

Figure 2:
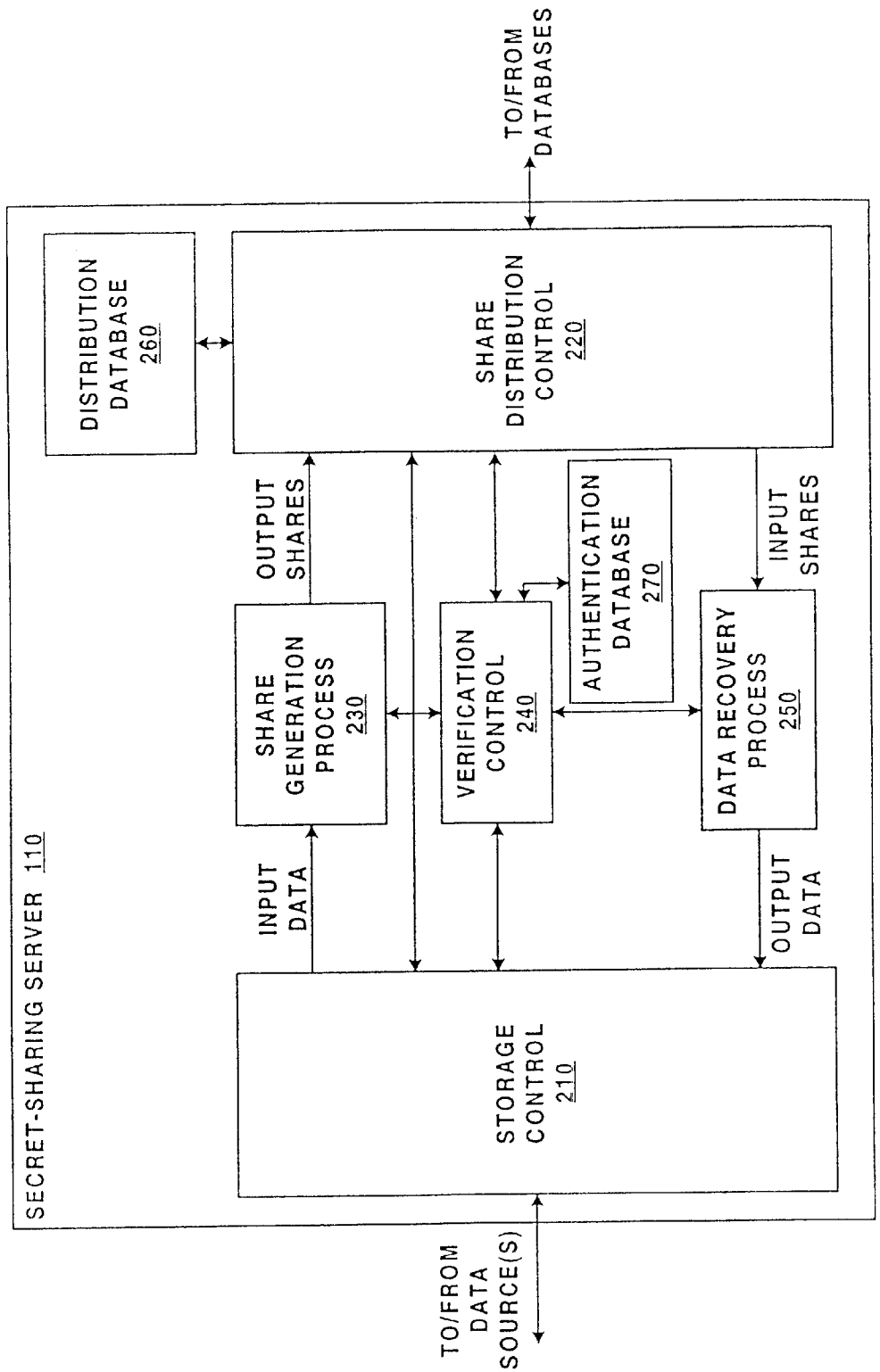
FIG. 2 illustrates a secret-sharing server in more detail according to one embodiment of the present invention.

FIG. 2 illustrates a secret-sharing server in more detail according to one embodiment of the present invention. Secret-sharing server 110 includes storage control 210, share distribution control 220, share generation process 230, verification control 240, and data recovery process 250 communicatively coupled together as illustrated. A distribution database 260 and an authentication database 270 may also be optionally included in server 110 as illustrated.

Data that is to be stored by server 110 is received by storage control 210. Storage control 210 communicates with verification control 240 to establish a password for the data to be stored. This password is communicated back to the source of the data to be stored and can subsequently be used by the source for retrieval of the stored data. Alternatively, the password could be generated by the source and provided to verification control 240 by the source.

In the illustrated embodiment, a client system 120 of FIG. 1 is the source of the data to be stored by server 110. Alternatively, the data may be provided directly to server 110 via, for example, a removable storage medium (e.g., a magnetic disk or tape).

According to one implementation, the password for a block of data is stored in authentication database 270 along with an identifier of the block of data. Such local storage allows server 110 to verify subsequent requests for data retrieval and retrieve blocks of data only for requestors with the correct password.

Additionally, storage control 210 forwards the data received to share generation process 230. Share generation process 230 generates multiple shares based on the received data and outputs the shares to share distribution control 220. The generation of shares by share generation process 230 is discussed in more detail below.

Share distribution control 220 is responsible for distributing the multiple shares to the databases 131–133 of FIG. 1 for storage. The exact methodology employed to distribute the shares is dependent on the nature of the couplings 145 between server 110 and databases 131–133. By way of example, share distribution control 220 may forward the shares to databases 131–133 as packets on a network, or alternatively may coordinate storage of the shares on different removable magnetic disks.

According to one embodiment of the present invention, share distribution control 220 also maintains a record in local distribution database 260 of where shares are distributed. Database 260 can then be used by share distribution control 220 to recover shares from databases 131–133 when such recovery is needed.

Requests for data retrieval from server 110 are received by storage control 210 and verified by verification control 240. In the illustrated embodiment, this verification is accomplished by comparing a password received from the requester with a password stored in authentication database 270 for the requested block of data. If the passwords do not match, then server 110 does not retrieve the requested block of data. However, if the passwords do match, then storage control 210 forwards the request for the data to share distribution control 220.

Share distribution control 220 is responsible for retrieving enough shares of the requested data in order for data recovery process 250 to recover the original data. The number of shares required may be pre-programmed into share distribution control 220, may be provided to distribution control 220 by another process or control of server 110, or may be stored in a database of server 110 (e.g., distribution database 260).

Upon receipt of a data retrieval request from storage control 210, share distribution control 220 accesses distribution database 260 to identify where shares of the requested data are stored. Share distribution control 220 then coordinates the retrieval of such shares from databases 131–133. As discussed above with reference to storing such shares, the exact methodology used to retrieve such shares is dependent on the nature of the couplings 145 between server 110 and databases 131–133.

Share distribution control 220 provides retrieved shares to data recovery process 250. Data recovery process 250, upon receiving enough shares of the data, can re-create the original block of data. Such recovery is dependent on the methodology used to create the shares by share generation process 230. In the illustrated embodiment, the inverse of the algorithm used by share generation process 230 is used by data recovery process 250 to re-create the block of data.

Data recovery process 250 forwards the recovered block of data to storage control 210, which in turn returns the block of data to the requestor.

According to one embodiment of the present invention, share distribution control 220 deletes all shares of a block of data when the block is re-created. Thus, once a block of data is retrieved from server 110, the block of data cannot be subsequently re-created again by server 110. According to an alternate embodiment of the present invention, share distribution control 220 does not delete all shares of a block of data, thereby allowing subsequent requests for retrieval of the block of data to be serviced by server 110.

In the illustrated embodiment, share generation process 230 uses a "threshold scheme" to create the multiple shares of data. A threshold scheme is one in which multiple (n) shares are generated based on the block of data. Each of these shares may be substantially the same size as the block of data, or may be smaller or larger. The exact size of the shares is dependent on the specific scheme that is employed. However, in order to re-create the block of data from the shares, only a subset (k) of the shares is required, with k being less than or equal to n and greater than or equal to 2. Any of a wide variety of conventional (k, n) threshold schemes can be used by share generation process 230, such as that disclosed by Adi Shamir in "How to Share a Secret", Communications of the ACM, vol. 22, no. 11, 1979 (pp. 612–613).

Each individual share generated by a threshold scheme in and of itself provides virtually no information about the original block of data. In fact, even obtaining k–1 shares would provide virtually no information about the original block of data. Thus, the distributed database environment of the present invention provides for secure storage of a block of data because at least k shares of such data must be compromised before the security of the storage is broken. By way of example, assuming the original block of data is a two-page letter and the share generation process 230 uses a (20, 39) threshold scheme, then thirty-nine different shares are generated based on the two-page letter, twenty of which are required to re-create the letter. Thus, if an individual were to attempt to "hack" into the distributed database environment of the present invention, he or she must compromise no fewer than twenty of the distributed databases in order to re-create the letter. Even if nineteen of the distributed databases were comprised, no text from the letter could be read by the hacker.

It is to be appreciated that the data received by server 110 for storage can be any type of data and that server 110 is not concerned with what type of data is being stored. Such data could be text documents, parts of documents, images, software routines, etc. In the illustrated embodiment, server 110 is not aware of what type of data it is receiving. All server 110 is aware of is the particular block of data (i.e., a series of bits) that is to be stored. Additionally, such data may be encrypted by the source prior to provision to server 110.

Various embodiments of the present invention utilize encryption in order to provide further security for data storage. Encryption can be introduced at any one or more of multiple points in the present invention, as discussed in more detail below. Any of a wide variety of conventional encryption processes can be used by the present invention, including different encryption processes at different points in the secure document storage process. Examples of such encryption processes include the RSA encryption scheme which employs one or more encryption keys to encrypt the data.

According to one embodiment, share distribution control 220 encrypts each share prior to its distribution to one of the databases 131–133. According to another embodiment, storage control 210 encrypts the received data prior to the share generation process 230 generating the multiple shares.

Additionally, in one embodiment storage control 210 encrypts the data using an encryption key and forwards the encryption key to share generation process 230 to generate multiple shares based on the encryption key. In this embodiment, the input data itself may be stored in one or more locations and only the encryption key processed by share generation process 230, or alternatively both the input data and the encryption key can be processed by share generation process 230.

Furthermore, in one embodiment different threshold schemes are used for blocks of data and for the encryption keys. Additionally, in one alternate embodiment different threshold schemes can be used for different blocks of data (or for different encryption keys).

It is to be appreciated that, given the distribution of multiple shares to multiple distributed databases, in combination with only k shares being required to re-create the block of data, the secure data storage of the present invention provides increased fault tolerance. By way of example, if n shares are generated based on a block of data and only k shares are required to re-create the block of data, then n–k of the databases 131–133, or the couplings 145, of FIG. 1 can be temporarily or permanently unavailable (e.g., a temporary power loss or permanent damage due to a fire) and the data can still be re-created. For example, if share generation process 230 uses a (20, 39) threshold scheme, then nineteen (39–20) of the databases 131–133 could be temporarily or permanently unavailable and the data can still be re-created.

According to one embodiment, the present invention is implemented in software. In this embodiment, controls 210, 220, and 240 and processes 230 and 250 are implemented as a series of software routines which are executed by a processor. According to an alternate embodiment, the present invention is implemented in hardware. In this embodiment, controls 210, 220, and 240 and processes 230 and 250 are implemented as one or more logic circuits.

Figure 3:
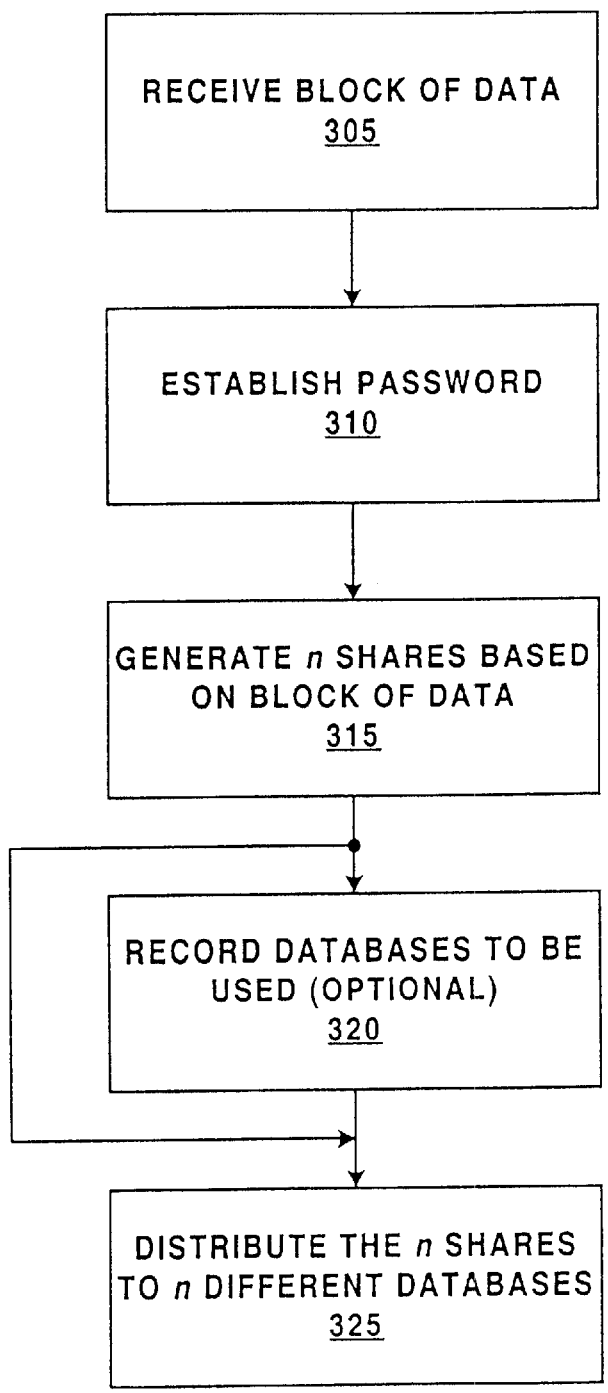
FIG. 3 is a flowchart illustrating the secure data storage process according to one embodiment of the present invention.

FIG. 3 is a flowchart illustrating the secure data storage process according to one embodiment of the present invention. The block of data to be securely stored is first received by server 110 of FIG. 1, step 305. A password is then established, step 310, either generated by server 110 or alternatively provided to server 110 by the source of the block of data as discussed above. Share generation process 230 then generates multiple (n) shares based on the block of data, step 315.

The location of where the n shares are to be stored is then optionally recorded, step 320. It is to be appreciated that in some embodiments, maintenance of such location information is not necessary. By way of example, if the distributed database environment only includes n distributed databases, and if each share is distributed to a different database, then each of the n databases receives one of the n shares.

Regardless of whether the location(s) of the n shares is stored (step 320), server 110 distributes the n shares to n different databases 131–133 of FIG. 1, step 325. In the illustrated embodiment, server 110 maintains no copy of either the shares or the original block of data after the shares have been distributed to the databases 131–133.

In alternate embodiments of the present invention, the n shares are distributed to fewer than n databases, with some databases storing multiple shares. However, it should be noted that secure storage of the original block of data is increased by using at least n databases.

Figure 4:
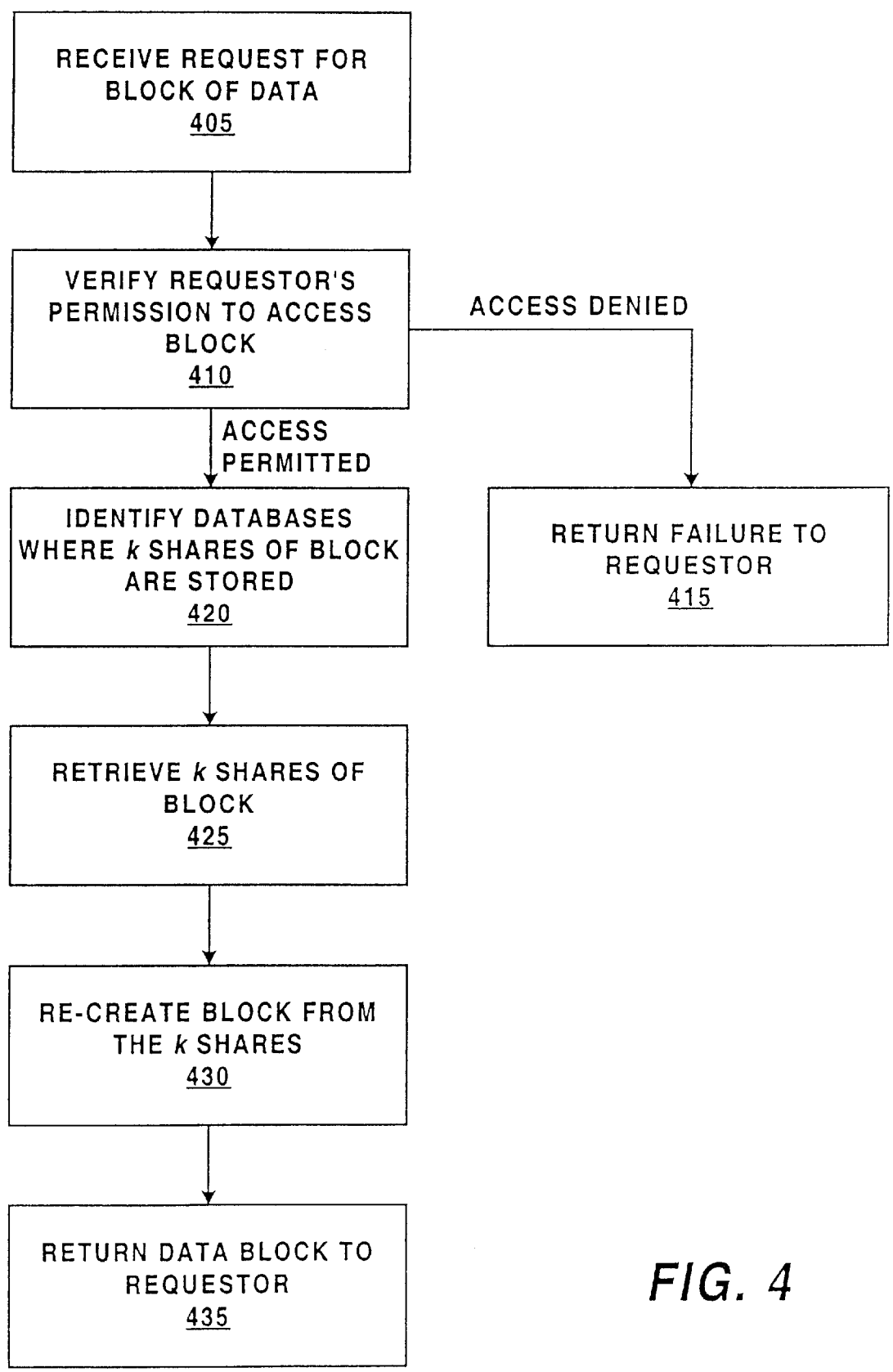
FIG. 4 is a flowchart illustrating the secure data recovery process according to one embodiment of the present invention.

FIG. 4 is a flowchart illustrating the secure data recovery process according to one embodiment of the present invention. A request for a block of data is first received by server 110, step 405. In the illustrated embodiment, such a request is also accompanied by a password. In response to the request, server 110 verifies that the requestor is permitted to access the block step 410. In the illustrated embodiment, this verification is performed by comparing the received password to a previously stored password, with access being permitted if the received and stored passwords match.

If access is denied, then server 110 returns a failure indication to the requestor, step 415. In one embodiment, the nature of the failure indication is such that it informs the requestor that he or she is not permitted to access the data (e.g., an "invalid password" message). Alternatively, the nature of the failure indication may be such that it merely indicates access to the server is currently not available, thereby not alerting the requestor to the fact that the server 110 has identified him or her as attempting to access a document for which he or she does not have access rights.

However, if access is permitted, then server 110 identifies databases where k shares of the block are stored, step 420. This identification process may be based on determining where shares are located (e.g., there are more databases in the distributed database environment than there are shares), or alternatively may be based on determining which of the distributed databases are currently, most easily, or most quickly accessible.

Once the databases where k shares are located are identified, server 110 retrieves the k shares for the block of data step 425. Server 110 then re-creates the block from the k shares, step 430, and returns the re-created data block to the requester, step 435.

Figure 5:
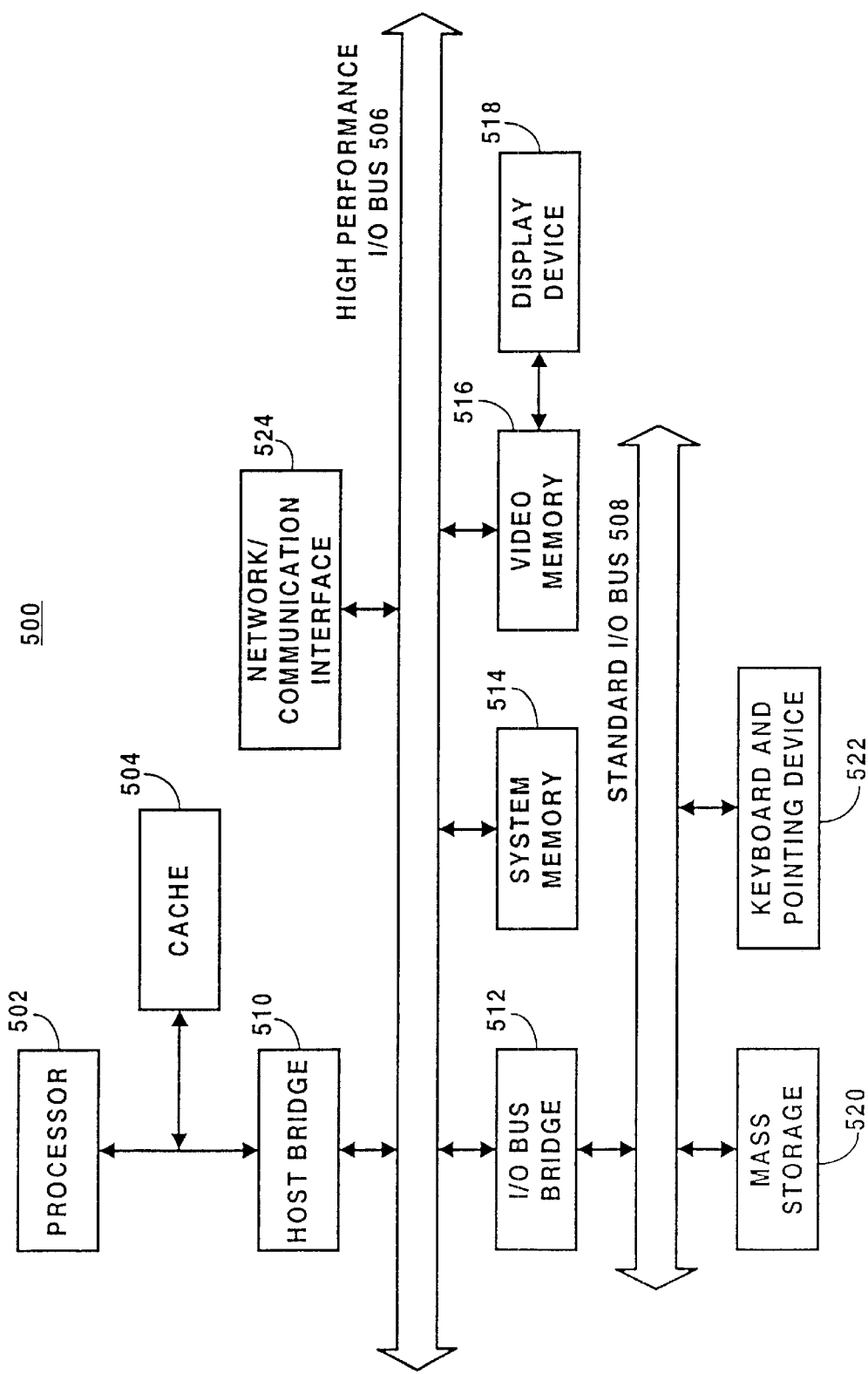
FIG. 5 illustrates one embodiment of a hardware system suitable for use with the present invention.

FIG. 5 illustrates one embodiment of a hardware system suitable for use with the present invention. In one embodiment, server 110 illustrated in FIG. 1 is a hardware system 500 of FIG. 5. In the illustrated embodiment, hardware system 500 includes processor 502 and cache memory 504 coupled to each other as shown. Additionally, hardware system 500 includes high performance input/output (I/O) bus 506 and standard I/O bus 508. Host bridge 510 couples processor 502 to high performance I/O bus 506, whereas I/O bus bridge 512 couples the two buses 506 and 508 to each other. Coupled to bus 506 are network/communication interface 524, system memory 514, and video memory 516. In turn, display device 518 is coupled to video memory 516. Coupled to bus 508 is mass storage 520 and keyboard and pointing device 522.

These elements 502–522 perform their conventional functions known in the art. In particular, network/communication interface 524 is used to provide communication between system 500 and any of a wide range of conventional networks, such as a LAN (e.g., using an Ethernet or token ring), the Internet, etc. It is to be appreciated that the circuitry of interface 524 is dependent on the type of network the system 500 is being coupled to.

Mass storage 520 is used to provide permanent storage for the data and programming instructions to implement the above described functions, whereas system memory 514 is used to provide temporary storage for the data and programming instructions when executed by processor 502. Mass storage 520 may be provided with the programming instructions by loading the programming instructions from a distribution storage medium (not shown), or by downloading the programming distributions from a server (not shown) coupled to hardware system 500 via network/communication interface 524. Collectively, these elements are intended to represent a broad category of hardware systems, including but not limited general purpose computer systems based on processors available from Intel Corporation of Santa Clara, Calif., from Advance Micro Devices (AMD) of Sunnyvale, Calif., from National Semiconductor of Sunnyvale, Calif., or from Digital Equipment Corporation (DEC) of Maynard, Mass.

It is to be appreciated that various components of hardware system 500 may be rearranged. For example, cache 504 may be on-chip with processor 502. Furthermore, certain implementations of the present invention may not require nor include all of the above components. For example, mass storage 520, keyboard and pointing device 522, and/or display device 518 and video memory 516 may not be included in system 500. Additionally, the peripheral devices shown coupled to standard I/O bus 508 may be coupled to high performance I/O bus 506; in addition, in some implementations only a single bus may exist with the components of hardware system 500 being coupled to the single bus. Furthermore, additional components may be included in system 500, such as additional processors, storage devices, or memories.

In one embodiment, controls 210, 220, and 240, and processes 230 and 250 of FIG. 2 discussed above are each implemented as a series of software routines run by the hardware system of FIG. 5. These software routines comprise a plurality or series of instructions to be executed by a processor, such as processor 502 of FIG. 5. Initially, the series of instructions are stored on a storage device, such as mass storage 520. The instructions are copied from storage device 520 into memory 514 and then accessed and executed by processor 502. It is to be appreciated that these routines can be implemented in any of a wide variety of programming languages. In alternate embodiments, the present invention is implemented in discrete hardware or firmware. For example, an application specific integrated circuit (ASIC) could be programmed with the above described functions of the present invention.

According to one embodiment, the present invention also makes use of "smartcard" technology. In this embodiment, a user at client system 120 utilizes a smartcard in order to store and/or retrieve data from server 110. The smartcard includes a series of software instructions that, when the smartcard is coupled to client system 120, execute in combination with software instructions stored at client system 120 to be able to request data storage to and/or retrieval from server 110. The coupling of a smartcard to client system 120 can be done in any of a wide variety of conventional manners, such as by using a magnetic strip reader, using pins or other contacts on the client system 120 that provide an electrical coupling to receptors or other contacts on the smartcard, etc.

Additionally, in alternate embodiments additional security mechanisms can be employed to augment the secure document storage of the present invention. By way of example, digital signatures may be employed in addition to the password discussed above to further verify a requestor's ability to either store or retrieve data.

Thus, a distributed database environment that provides secure data storage has been described. Multiple shares based on the data to be stored by the present invention are advantageously generated so that at least a subset of the shares is necessary in order to re-create the original data. Therefore, security breaches in fewer databases than there are shares in the subset advantageously keeps the stored data secure.

Thus, a method and apparatus for secure data storage using distributed databases has been described. Whereas many alterations and modifications of the present invention will be comprehended by a person skilled in the art after having read the foregoing description, it is to be understood that the particular embodiments shown and described by way of illustration are in no way intended to be considered limiting. References to details of particular embodiments are not intended to limit the scope of the claims.

What is claimed is:

1. A method comprising:
    establishing a password associated with a received block of data, the password for use in later re-creation of the block of data;
    encrypting, using an encryption key, the block of data;
    generating, using a first threshold scheme, a first plurality of shares based on the block of data, at least a subset of the first plurality of shares is needed to re-create the block of data;
    distributing the first plurality of shares to a plurality of distributed databases;
    generating, using a second threshold scheme, a second plurality of shares based on the encryption key, at least a subset of the second plurality of shares is needed to re-create the encryption key; and
    distributing the second plurality of shares to the plurality of distributed databases.

2. The method of claim 1, wherein the distributing comprises distributing the first plurality of shares to the plurality of databases each located in different ones of a plurality of distributed servers.

3. The method of claim 1, wherein the establishing of the password includes storing the password in an authentication database.

4. The method of claim 1, further comprising:
    receiving a request to retrieve the block of data, the request including a submitted password;
    comparing the submitted password to the password;
    accessing at least a subset of the plurality of databases to retrieve a second plurality of shares if the submitted password matches the password; and
    re-creating the block of data using the second plurality of shares.

5. The method of claim 4, wherein the number of shares in the subset is equal to the number of shares in the second plurality of shares.

6. The method of claim 1, wherein the number of shares in the subset is less than the number of shares in the first plurality of shares.

7. The method of claim 1, further comprising:
    returning, to a source of the block of data, a password corresponding to the block of data.

8. An apparatus comprising:
    a storage controller to encrypt, using an encryption key, the block of data prior to providing the block of data to a share generator;
    a share generator coupled to the storage controller, the share generator to generate, using a first threshold scheme, a first plurality of shares based on a block of data, at least a subset of the first plurality of shares is needed to re-create the block of data, the share generator to further generate, using a second threshold scheme, a second plurality of shares based on the encryption key, at least a subset of the second plurality of shares is needed to re-create the encryption key;
    a verification controller coupled to the share generator, the verification controller to establish a password to control subsequent re-creation of the block of data; and
    a share distributor coupled to the share generator, the share distributor to distribute the first plurality of shares to a plurality of distributed databases and to distribute the second plurality of shares to the plurality of distributed databases.

9. The apparatus of claim 8 further comprising an authentication database coupled to the verification controller, the authentication database to store the password along with an identifier to identify the block of data corresponding to the password.

10. The apparatus of claim 9 further comprising a storage controller coupled to the verification controller and the share generator, the storage controller commmunicates with the verification controller to establish the password and to return the password to a source of the block of data.

11. The apparatus of claim 8, further comprising:
    data recovery logic coupled to the share distributor and the verification controller, the data recovery logic to re-create the block of data using the second plurality of shares if the verification circuit confirms that a password submitted with a request for re-creation of the block of data matches the password; and
    wherein the share distributor is to access at least a subset of the plurality of databases to retrieve a second plurality of shares.

12. The apparatus of claim 11, wherein a number of shares in the subset of the first plurality of shares is equal to a number of shares in the second plurality of shares.

13. The apparatus of claim 8, wherein a number of shares in the subset of the first plurality of shares is less than a number of shares in the first plurality of shares.

14. A machine-readable medium having stored thereon a plurality of instructions, designed to be executed by a processor, for implementing a function to (i) establish a password associated with a block of data for use in authenticating that subsequent re-creation of the block of data is proper, (ii) to encrypt, using an encryption key, the block of data prior to a first plurality of shares being generated, (iii) generate, using a first threshold scheme, a first plurality of shares based on a block of data, wherein at least a subset of the first plurality of shares is needed to re-create the block of data, (iv) to generate, using a second threshold scheme, a second plurality of shares based on the encryption key, at least a subset of the second plurality of shares is needed to re-create the encryption key, and (v) to distribute the first plurality of shares to a plurality of distributed databases and to distribute the second plurality of shares to the plurality of distributed databases.

15. The machine-readable medium of claim 14, wherein the plurality of instructions for implementing the function to distribute comprises a plurality of instructions for implementing a function to distribute the first plurality of shares to the plurality of databases each located in different ones of a plurality of distributed servers.

16. The machine-readable medium of claim 15, wherein the plurality of instructions for implementing the function to distribute comprises a plurality of instructions for implementing a function to store the password in an authentication database.

17. The machine-readable medium of claim 14, wherein the plurality of instructions are further for implementing a function (i) to receive a request to retrieve the block of data, the request including a submitted password, (ii) comparing the submitted password to the password, (iii) to access at least a subset of the plurality of databases to retrieve a second plurality of shares if the submitted password matches the password, and to re-create the block of data using the second plurality of shares.

18. The machine-readable medium of claim 17, wherein the number of shares in the subset is equal to the number of shares in the second plurality of shares.

19. The machine-readable medium of claim 14, wherein the number of shares in the subset is less than the number of shares in the first plurality of shares.

20. An apparatus comprising:

means for generating, using a first threshold scheme, a first plurality of shares based on a block of data in which at least a subset of the first plurality of shares is needed to re-create the block of data and also for generating, using a second threshold scheme, a second plurality of shares based on an encryption key, at least a subset of the second plurality of shares is needed to re-create the encryption key;

means for encrypting, using the encryption key, the block of data prior to the first plurality of shares being generated by the means for generating;

means for establishing a password to control re-creation of the block of data, the means for establishing the password being coupled to the means for generating; and means for distributing the first plurality of shares to a plurality of distributed databases and for distributing is also for distributing the second plurality of shares to the plurality of distributed databases, the means for distributing being coupled to the means for generating.

21. The apparatus of claim 20, further comprising:

means for receiving a request to retrieve the block of data, the request including a password from a requestor, the means for receiving the request being coupled to the means for generating;

means for re-creating the block of data using the second plurality of shares; and wherein the means for distributing is also for accessing at least a subset of the plurality of databases to retrieve the second plurality of shares.

* * * * *